Figure 2:
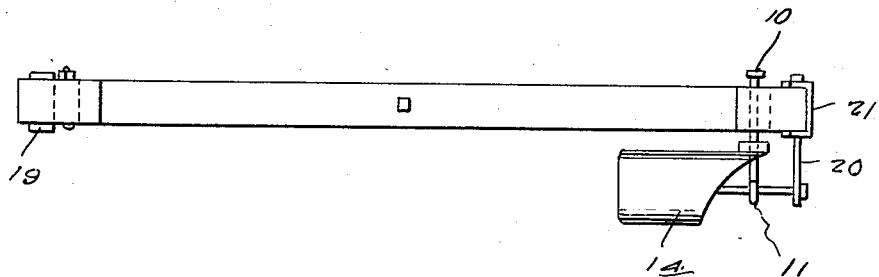

June 16, 1931.  J. H. SYMANK  1,810,797
SHOCK ABSORBER
Filed May 22, 1929  2 Sheets-Sheet 1
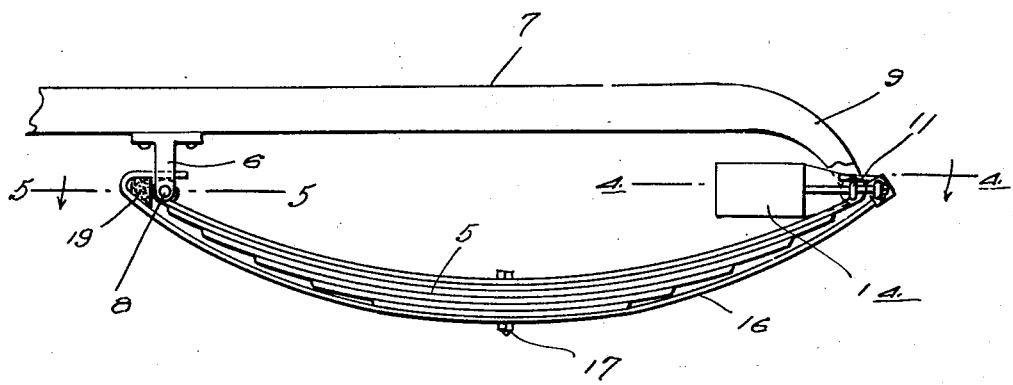
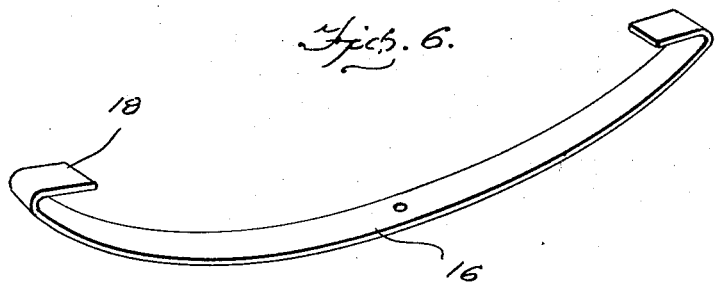
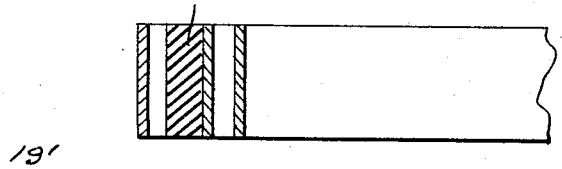
Inventor
John H. Symank
By Clarence A. O'Brien
Attorney June 16, 1931.  J. H. SYMANK  1,810,797
SHOCK ABSORBER
Filed May 22, 1929   2 Sheets-Sheet 2

Inventor
John H. Symank

By Clarence A. O'Brien
Attorney

UNITED STATES PATENT OFFICE

JOHN HEINRECK SYMANK, OF AUSTIN, TEXAS

SHOCK ABSORBER

Application filed May 22, 1929. Serial No. 365,048.

The present invention relates to shock absorbers for vehicle springs and particularly the semi-elliptical springs commonly used on automobiles and the object of the invention is to provide a device of this nature which is simple in construction, inexpensive to manufacture, easy to apply, strong and durable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 3:
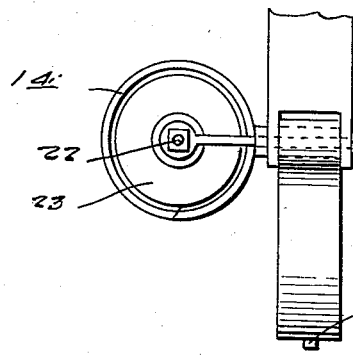
Figure 4:
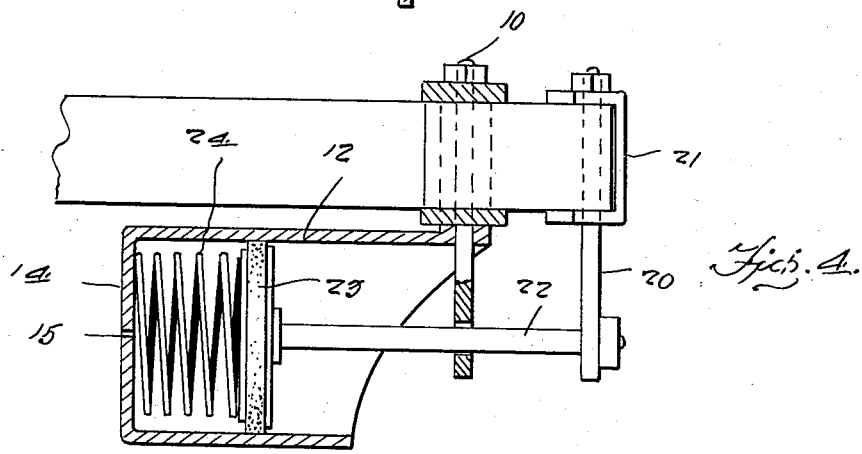

In the drawings:

Figure 1 is a side elevation of a vehicle spring with my apparatus mounted thereon, Figure 2 is a top plan view thereof, Figure 3 is an end elevation thereof, Figure 4 is a sectional view taken substantially on the line 4—4 of Figure 1, Figure 5 is a sectional view taken substantially on the line 5—5 of Figure 1, Figure 6 is a perspective view of the semi-elliptical leaf, and Figure 7 is a view similar to Figure 5 showing another embodiment of the invention.

Referring to the drawings in detail it will be seen that the numeral 5 denotes an ordinary multi-leaf elliptical spring in the present instance mounted at one end to a depending bracket 6 on frame member 7 by means of pin 8 and at the curved end 9 of the frame member 7 by means of a pin 10 which has an eye 11 at one end and holds in place a horizontally extending cylinder 12 having a closed end 14 with a central aperture 15.

A semi-elliptical leaf 16 is fixed under the spring and attached to the center thereof by means of a bolt 17. Inwardly directed lips 18 are formed at the end of the leaf 16 one of which extends over the pin 8 and a rubber buffer 19 is mounted in the track formed by this lip 18 with the leaf 16.

The other lip 18 extends over the bolt 10 and in the crotch formed by this other lip and the leaf 16 extends a bolt 20 also extending through a U-shaped clip 21. The bolt 20 extends to one side of the spring assembly and has a shank 22 attached thereto and on this shank 22 is a plunger 23 operating in the cylinder 12. A spring 24 in the cylinder impinges against the end 14 and the plunger.

Instead of the rubber buffer 19 there may be used a coil spring 19' as is shown in Figure 7.

From the above detailed description it will be seen that when the center of the spring 5 flexes upwardly the shank 22 will be pulled outwardly causing the plunger to be pulled outwardly and sucking air through the small aperture 15 and when the spring rebounds that is the center of the spring moves downwardly, the plunger will move inwardly and must overcome the tension of the spring 24 and at the same time drive the air out of the cylinder through the small opening 15 and thereby considerable of the shock will be absorbed and it will also be seen that a part of the shock will be absorbed by the buffer 19 or 19'.

It is thought that the construction, utility, operation and advantages of this invention will now be quite apparent to those skilled in this art without a more detailed description thereof.

The present embodiment of the invention has been described in detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination, a semi-elliptical spring, a leaf of semi-elliptical formation on the convexed side of the spring and having inwardly directed lip extensions over the ends of the spring, and a resilient cushioning element disposed between the leaf and one of the extensions and engaged with the spring.

2. In combination, a semi-elliptical spring, a leaf of semi-elliptical formation on the convexed side of the spring and having inwardly directed lip extensions over the ends of the spring, one end of the spring being mounted by an eye bolt, a shank extending through the eye bolt, a cylinder mounted on said eye bolt, a plunger on the shank operable in the cylinder, and means for anchoring the shank in the crotch formed by one of the ends with the leaf.

3. In combination, a semi-elliptical spring, a leaf of semi-elliptical formation on the convexed side of the spring and having inwardly directed lip extensions over the ends of the spring, one end of the spring being mounted by an eye bolt, a shank extending through the eye bolt, a cylinder mounted on said eye bolt, a plunger on the shank operable in the cylinder, and means for anchoring the shank in the crotch formed by one of the ends with the leaf, buffer means in the other crotch formed by the other end and the leaf.

In testimony whereof I affix my signature.

JOHN HEINRECK SYMANK.